C. J. CUMMINGS.
Nut-Lock.
No. 159,306. Patented Feb. 2, 1875.
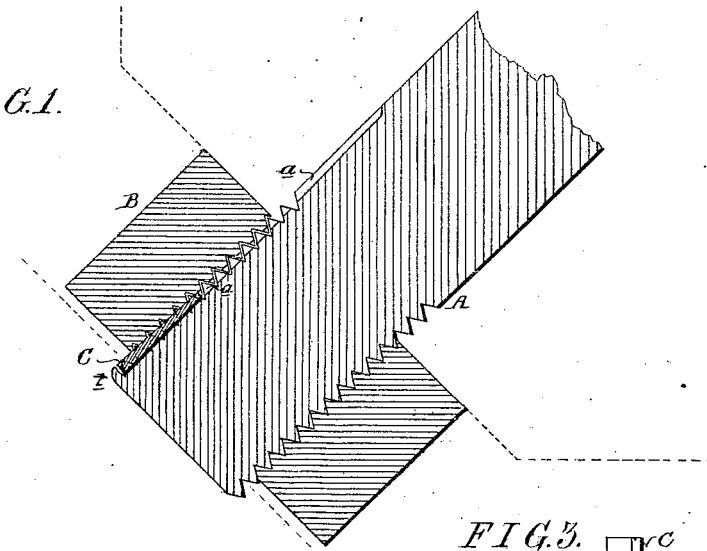
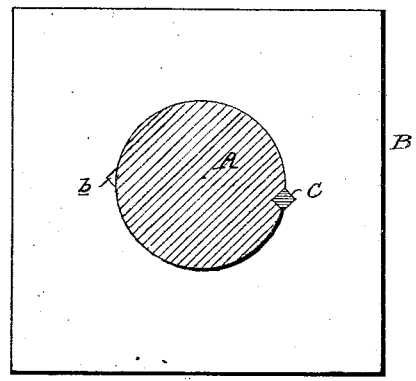
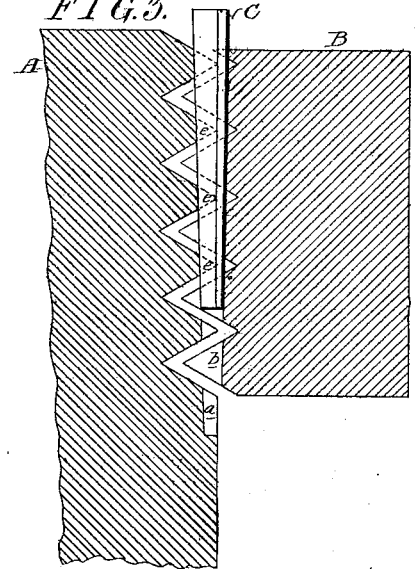
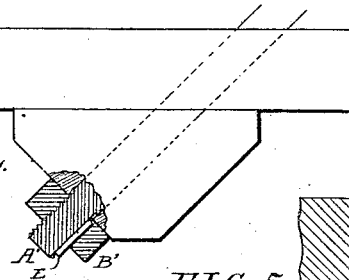
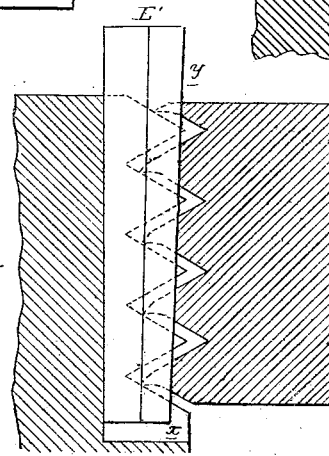
Witnesses:
R. M. Barr.
J. L. Skidmore
C. J. Cummings
By his attys
Howson Son

UNITED STATES PATENT OFFICE.

CHARLES J. CUMMINGS, OF PREBLE, NEW YORK.

IMPROVEMENT IN NUT-LOCKS.

Specification forming part of Letters Patent No. 159,306, dated February 2, 1875; application filed October 10, 1874.

*To all whom it may concern:*

Be it known that I, CHARLES JAMES CUMMINGS, of Preble, Cortland county, New York, have invented an Improved Lock-Nut, of which the following is a specification:

My invention relates to that class of nut-retainers in which a key fitting coinciding grooves in the bolt and nut prevents the latter from turning; the object of my invention being to securely retain the nut without preventing its ready removal, and without injury to either nut or bolt.

This object I accomplish by forming the grooves for the reception of the key in the threads only of the nut and bolt, and by using a rectangular key, the corners of which extend into said grooves, as shown in the sectional view, Figure 1, end view, Fig. 2, and diagram, Fig. 3, of the accompanying drawing.

The ordinary mode of securing nuts by keys is shown in Fig. 4, and consists in fitting a key, E, of uniform diameter in corresponding recesses in the bolt and nut. This fastening is objectionable, owing to the liability of the key to escape when the bolt is inclined, as well as to the fact that, while the nut is prevented from turning, it is still loose, and by its vibration aids in displacing the key. These difficulties have been partially remedied by using a tapering steel key, E', Fig. 5, fitting a recess, $x$, in the bolt, and having a sharp edge, $y$, which cuts its own groove across the threads of the nut B' when the key is driven inward.

It will be apparent that the threads of the nut are so battered by once inserting the key as to prevent the turning of the nut to tighten the fastening, and the employment of the nut after it has once been secured.

In my improved retainer the grooves $a\,b$ are cut across the threads of the nut and bolt, care being taken that the grooves do not extend below the bottoms of the threads, and that they are angular or V-shaped, to receive the corners of a rectangular tapering key, C, which, when driven inward, will not only prevent any revolution of the nut, but will also wedge the nut to the bolt, and is itself securely wedged in its place.

To render the key more secure, a lip, $t$, may be formed opposite the end of the key by striking the end of the bolt a blow with a hammer.

While the key thus inserted will effectually resist any ordinary power applied to turn the nut, its thin V-shaped edges are so presented to the sharp edges $e\,e$, formed by cutting the grooves across the threads, that when sufficient force is applied by means of a wrench or other tool, the nut will turn, and the edges $e\,e$ will cut their way through the thin corners of the key, so that by continuing the revolution the nut may be adjusted or entirely removed.

It will be apparent that the securing and removing of the nut are effected without injury to any part of the fastening except the key, which is cheaply and easily replaced.

I do not claim channeling the nut or bolt, nor the use of a tapering key; but

I claim—

The bolt A and nut B, having angular grooves across the threads, above the bottoms thereof, for the reception of a rectangular tapering key, C, as set forth.

In testimony whereof I have signed my name to this specification in the presence of two subscribing witnesses.

C. J. CUMMINGS.

Witnesses:
 CHARLES E. FOSTER,
 WILLIAM L. BRAMHALL.